May 17, 1955     R. E. BENOIST     2,708,593
HOLE DIGGING AND PLANTING DEVICES
Filed Oct. 23, 1952     2 Sheets-Sheet 2

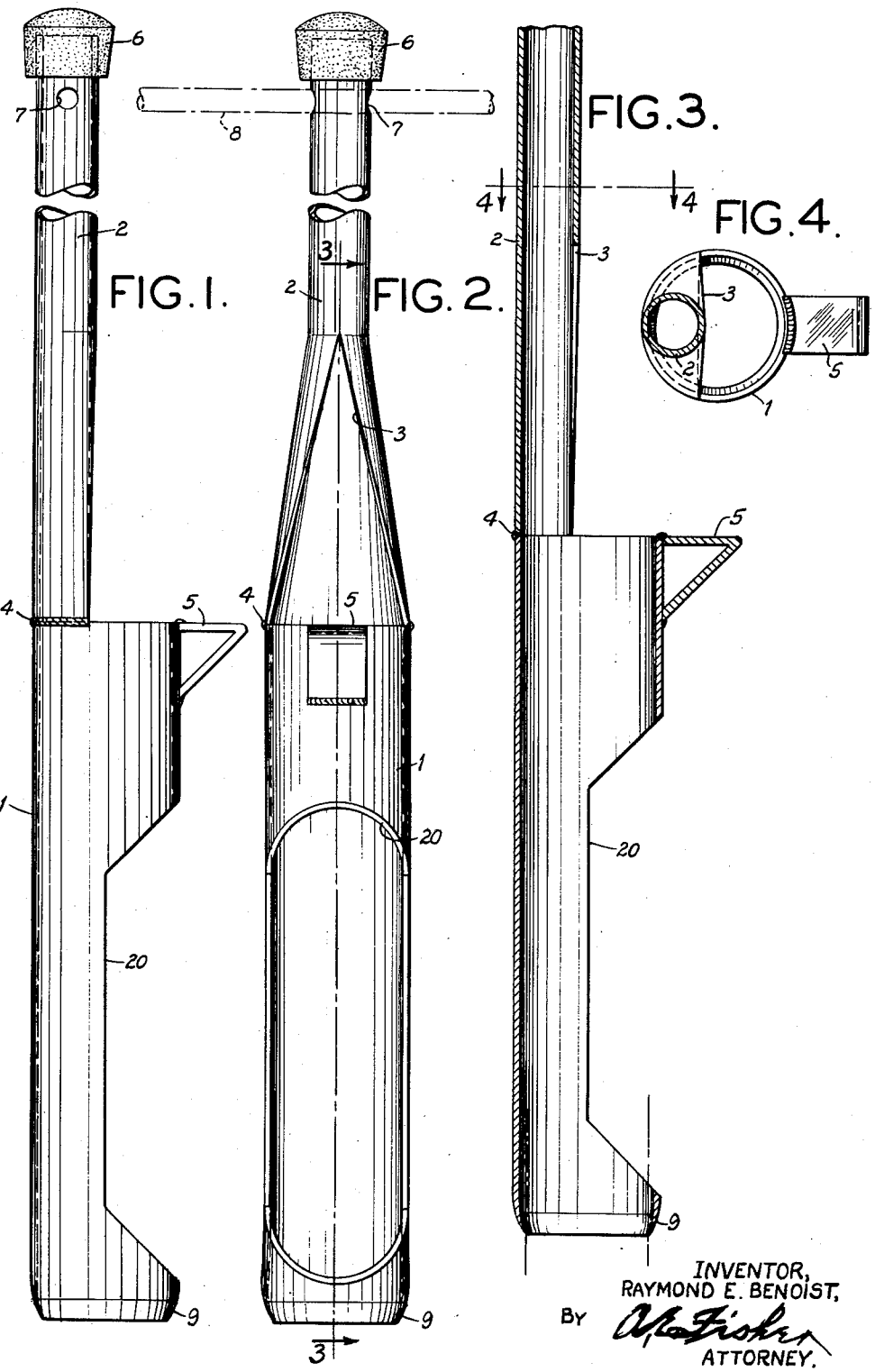

INVENTOR,
RAYMOND E. BENOIST,
BY *A.E. Fisher*
ATTORNEY.

United States Patent Office 2,708,593
Patented May 17, 1955

2,708,593
HOLE DIGGING AND PLANTING DEVICES
Raymond E. Benoist, Mount Vernon, Ill.
Application October 23, 1952, Serial No. 316,518
1 Claim. (Cl. 294—50.7)

This invention pertains to a device for digging holes in the ground for planting seeds or plants or, in larger sizes, for post holes or the like.

The device comprises, generally, a cutting tube of a diameter to cut the size of hole desired and provided with an operating handle. The lower end of the tube is open and has its wall contracted slightly and formed with a cutting edge, either a knife edge or with teeth. An extended portion of one side of the tube is cut away for about half its circumference to provide a discharge port. This opening terminates above the lower end of the tube so as to leave the lower rim intact to support the core of earth cut out.

Figure 5:
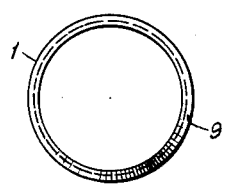
Figure 7:
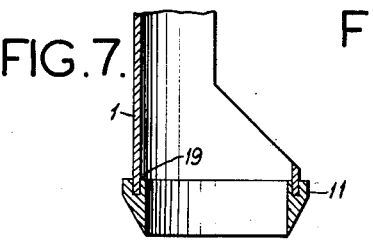
Figure 8:
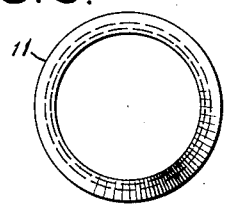
Figure 9:
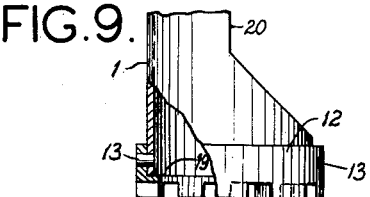
Figure 6:
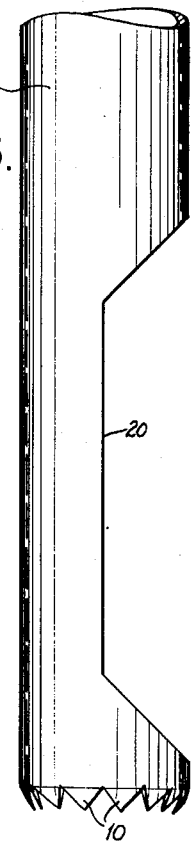
Figure 10:
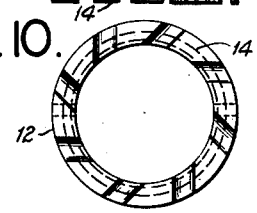
Figure 11:

A preferred embodiment of this invention is illustrated in the accompanying drawings, in which Figure 1 is a side view of a device embodying this invention, Figure 2 is a front view of the same, Figure 3 is a section on line 3—3 of Fig. 2, Figure 4 is a section on line 4—4 of Fig. 3, Figure 5 is a bottom end view of Fig. 1, Figure 6 is a fragmentary side view showing another form of cutting edge, Figure 7 is a fragmentary sectional view showing the cutting edge formed on a collar, Figure 8 is a bottom end view of Fig. 7, Figure 9 is a fragmentary view, partly in section, showing another form of cutting collar, Figure 10 is a bottom end view of Fig. 9, Figure 11 is a fragmentary sectional view showing a screw mounting for the cutting collar.

Figure 12:
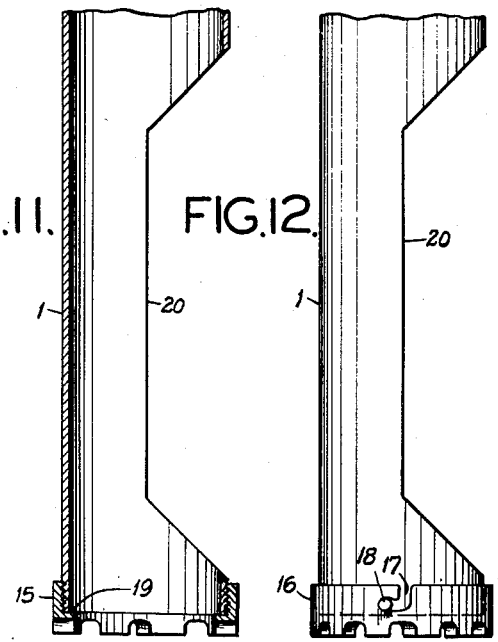
Figure 13:
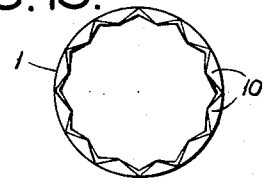

Figure 12 is a fragmentary side view showing a bayonet mounting for the cutting collar, and Figure 13 is a bottom end view of Fig. 6.

Referring now to the drawing, 1 designates the cutting tube, which is constructed of metal or other suitable material strong enough to withstand the stresses involved. A handle 2 of any suitable form is attached to the tube 1. In the embodiment shown this handle is also tubular in form. The lower portion thereof is split longitudinally for a part of its length as shown at 3, and the lower edge of the split portion is welded to the tube 1 at 4. The handle 2 thus extends in prolongation of the tube 1 to provide for easy manipulation of said tube. A foot plate 5 may be welded or otherwise secured to the tube 1 so that foot pressure may be used to assist in sinking the tube into the ground. The handle may be provided with a hand pad 6 of any suitable type. A hole 7 in the handle provides for the use of a bar 8 to gain leverage for rotating the tube 1.

The lower end of the tube 1 is open and, in the embodiments of Figures 1 to 6, the end of the tube wall is swaged inward slightly as indicated at 9 in Fig. 3. This provides an inner ledge adapted to support the earth core that is cut out. In Figures 1 to 4 this cutting edge is formed to a knife edge. In Fig. 6 saw teeth 10 are formed at this edge. In the arrangement of Figures 7 and 8 a collar 11 is welded or otherwise secured to the tube 1 and has its lower edge sharpened to a cutting edge. In Figs. 9 and 10 a similar collar 12 is attached to the tube 1 by dowels 13 and has a relatively broad lower edge formed with cutting teeth 14. As shown in Fig. 10, each tooth 14 has its cutting edge arranged in angular relation to the tube radius to that tooth. With this arrangement rotation of the digger in one direction will cause the cuttings formed by the teeth 14 to move to the inside of the tube. If, however, the teeth should become clogged reverse rotation will cause outward movement of the cuttings to clear the teeth. In Fig. 11 the cutting collar 15 is attached by screwing it onto the tube 1. In Fig. 12 the collar 16 is mounted by engagement of a bayonet slot 17 in the collar with a pin 18 on the tube. It will be noted that in each case the cutting collar is formed with a small inner ledge 19 adapted to support the earth core to lift it out of the hole.

In order that the earth core may be discharged from the tube 1, an extended section of said tube is cut away as shown at 20. The cut-away section extends laterally for about one-half the circumference of the tube so as to provide a wide opening for discharge of the core. This opening terminates above the cutting edge of the tube so as to provide a continuous lower rim to support the core as it is lifted out of the hole.

It will be seen that this invention provides a simple and inexpensive digger which may be used for various purposes. In smaller sizes it may be used for weeding gardens or for planting seeds or plants. In larger sizes it may be used for digging post holes and the like. This post hole digger or rotary drill may be turned or forced into the earth manually or by means of powered machinery, so arranged to force the drill into the earth or extract same from the earth. By simply lifting the digger from the hole the earth core is lifted out. The core may then be discharged through the top or through the opening 20.

A digger of similar, but modified structure is disclosed in my co-pending application Serial No. 316,519, filed October 23, 1952.

I claim:

A hole digging device, comprising, a cutting tube having its lower end open, an operating handle secured to said tube in prolongation thereof, said operating handle including a tubular member having its back wall vertically aligned with the cutting tube and having a cross bar extending transversely through its upper end, an extended portion of one side of said tube being cut away for substantially one-half of its circumference forming a permanently-open discharge port terminating above said open end, and a cutting collar secured to said open end of said tube and having cutting teeth formed with their cutting edges angular to the tube radii to the teeth.

References Cited in the file of this patent

UNITED STATES PATENTS

| | | |
|---|---|---|
| 1,520,803 | Brown | Dec. 30, 1924 |
| 1,829,002 | Gillogly | Oct. 27, 1931 |
| 2,014,311 | Council | Sept. 10, 1935 |
| 2,159,249 | Brantly | May 23, 1939 |
| 2,583,214 | Hanzlik | Jan. 22, 1952 |
| 2,618,500 | Peach | Nov. 18, 1952 |

FOREIGN PATENTS

| | | |
|---|---|---|
| 163,222 | Great Britain | May 19, 1921 |